United States Patent [19]

Grosseau

[11] 3,851,722

[45] Dec. 3, 1974

[54] CRASH RESPONSIVE MOTOR MOUNTING

[75] Inventor: Albert Grosseau, Chaville, France

[73] Assignee: Societe Anonyme Automobiles Citroen, Paris, France

[22] Filed: Feb. 23, 1973

[21] Appl. No.: 335,175

[30] Foreign Application Priority Data

Mar. 10, 1972 France .............................. 72.08546

[52] U.S. Cl. ............ 180/82 R, 180/64 R, 180/64 L, 248/3
[51] Int. Cl. ........................ B60r 21/02, B60k 9/00
[58] Field of Search...180/82 R, 64 R, 64 M, 64 MM, 180/64 L, 89 R; 248/3, 6; 296/65 A

[56] References Cited
UNITED STATES PATENTS

| 1,995,031 | 3/1935 | Lee .................................... | 180/64 R |
| 2,179,959 | 11/1939 | Schroedter ....................... | 180/64 R |
| 2,612,233 | 9/1952 | Newell .............................. | 180/89 R |
| 2,900,036 | 8/1959 | Blake ................................ | 180/82 R |
| 3,165,161 | 1/1965 | Nallinger .......................... | 180/64 R |
| 3,302,740 | 2/1967 | Giacosa ............................ | 180/64 R |
| 3,347,501 | 10/1967 | Eimeren ........................... | 180/64 R |
| 3,525,413 | 8/1970 | Kripke .............................. | 180/82 R |
| 3,589,466 | 6/1971 | Dudley ............................. | 180/82 R |
| 3,638,748 | 2/1972 | Tixier ............................... | 180/64 R |
| 3,752,247 | 8/1973 | Schwenk .......................... | 180/64 R |

Primary Examiner—David Schonberg
Assistant Examiner—John P. Silverstrim
Attorney, Agent, or Firm—Stevens, Davis, Miller & Mosher

[57] ABSTRACT

The automobile has an engine, placed at the front of the vehicle, the engine or the motor-propellant unit being connected to the body and/or to the chassis by fixing elements such as elastic supports and ties. Frame means for the engine extend in the front of the engine and have sufficient mechanical strength so that, on a frontal shock against an obstacle, the whole being deformed, said frame means cause an increase in deceleration of the vehicle which reaches a critical value before the front part of the engine comes into abutment against a surface. At least one of the fixing elements of the engine breaks so as to liberate the engine when said critical value of deceleration is reached.

13 Claims, 2 Drawing Figures

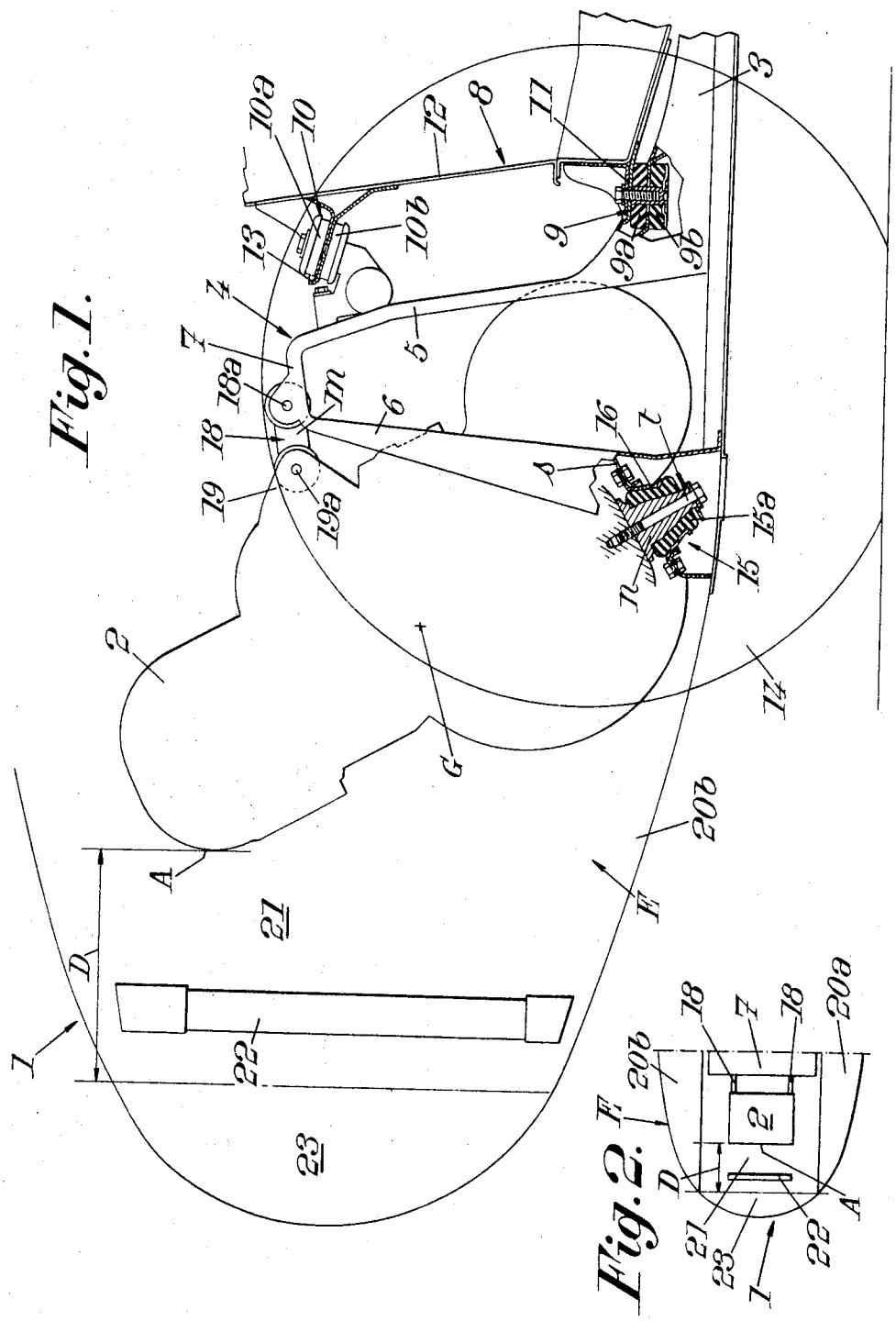

CRASH RESPONSIVE MOTOR MOUNTING

The invention relates to improvements in or to automobile vehicles with an engine, especially transversal, placed at the front of the vehicle, the engine or the motor-propellant group being connected to the body and/or to the chassis by fixing elements such as elastic supports and ties.

The invention relates more particularly, but not exclusively, to passenger automobile vehicles.

It is a particular object of the invention to render the abovesaid vehicles such that they respond to the various exigencies of practice better than hitherto and especially such that they offer a passive safety, that is to say safety in the case of collision, especially frontal, which is greater, without the vehicle being made heavier.

According to the invention, an automobile vehicle with an engine, especially transversal, placed at the front of the vehicle, the engine being connected to the body and/or the chassis by fixing elements such as elastic supports and ties, is characterised by the fact that, on one hand, it comprises frame means, especially lateral, of the engine which are extended forward from this engine and have a sufficient mechanical strength so that, on a frontal shock against an obstacle, these frame means cause, whilst being deformed, an increase in deceleration of the vehicle which reaches a critical value before the front part of the engine comes into abutment against a wall and that, on the other hand, at least one of the fixing elements of the engine is arranged so as to free the engine when the abovesaid critical value of the deceleration is reached Advantageously, the fixing element adapted to free the element is constituted by a tie in the form of a rod adapted to be broken when the deceleration of the vehicle reaches the abovesaid critical value. The rod is oriented, preferably, in the longitudinal direction of the vehicle.

The critical value of the deceleration is of the order of 80 to 100 m/s$^2$.

Advantageously, the frame means of the engine are constituted by lateral parts of the body work, adapted, by their deformation in the case of frontal shock, to absorb at least a part of the kinetic energy of the vehicle.

The invention consists, apart from the features revealed above, of certain other features which will be more explicitly considered below, with regard to the detailed description, with reference to the accompanying drawing, of a preferred embodiment of the invention, but which is in no way limited.

FIG. 1 of this drawing shows diagrammatically, in elevation, with parts removed, the front of a vehicle according to the invention.

FIG. 2, lastly, is a diagram showing in plan view, on a reduced scale, the front of the vehicle according to the invention.

Referring to the drawing, there can be seen the front part 1 of an automobile vehicle whose engine 2, placed in the front, is arranged transversely, that is to say that the shaft of the engine is perpendicular to the longitudinal direction of the vehicle. The term "engine" is used in a special sense and envisages not only the engine proper, but also, as in the present case, the motor-propellant unit. The engine comprises a chassis 3 which is raised towards the front to form a sort of hollow caisson 4 comprising two substantially vertical walls 5 and 6, and an upper wall 7 ensuring the connection between the two vertical walls.

The vehicle comprises a body 8 connected to the chassis by elastic fixing elements, such as the elements 9 and 10 shown in FIG. 1. The body 8 has, at the front and at its lower part, a horizontal fixing lug 11, projecting towards the front, the elastic fixing element 9 being shown on this lug 11. The body 8 has, still at its front part, a substantially vertical wall 12, provided at its upper part with a fixing lug 13, this lug 13 being connected to the chassis by the element 10.

Each elastic fixing element 9 and 10 is composed of two blocks of elastomeric material, respectively 9a, 9b and 10a, 10b, compressed, by a screw and nut device, between two metallic plates, of which one is fast to one of the parts (body or chassis) to be connected, the other part (chassis or body) being gripped between the two blocks of elastomeric material.

The raised part 4 of the front of the chassis 3 serves advantageously as a support for the articulations of the suspension arms (not shown) of the front wheels 14.

The motor-propellant unit 2 is connected to the chassis by elastic supports 15 comprising a substantially frustroconic block 15a, of elastomeric material, bonded by its outer surface to a metallic cup 16 fixed on a support s which is inclined towards the front and fast to the chassis 3. The block 15a is bonded by its inner surface to a metallic core n fixed to the casing of the motor-propellant unit 2 by a screw t. The block of elastomeric material 15a plays the role of a shock absorber between the core n, fast to the motor-propellant unit 2, and the cup 16 fast to the chassis 3.

The elastic supports 15 are provided at the lower part of the motor-propellant unit 2 and substantially at the lower level of the chassis 3. The centre of gravity G of the group 2 occurs above and in front of the supports 15.

The motor-propellant unit 2 is also held by at least one tie arranged in the form of a rod 18 oriented in the longitudinal direction of the vehicle. This rod 18 is articulated, at one end, on an axle 18a borne by the substantially horizontal part 7 of the chassis 3 and, at its other end, on an axle 19a borne by a lug 19 of the motor-propellant unit 2. The (or each) rod 18 is arranged to break when the deceleration to which the vehicle is subjected reaches a critical value which is of the order of 80 to 100 m/s$^2$ (meters per second per second), that is to say substantially 8 to 10 times, in absolute value, the acceleration of gravity.

The cross-section of the rod 18 is less in its middle part m than at its ends, so that rupture is produced in this part m.

The assembly could be arranged so that it is not the rod 18 which breaks, but that, for example, the fixing axle 18a of this rod 18 on the part 7 of the chassis 3 is sheared when the abovesaid deceleration is reached.

The vehicle comprises frame means E, especially lateral, of the motor-propellant unit, these means E comprising essentially two lateral overhangs 20a, 20b (FIG. 2) of the body work, having the shape of hollow caissons of which the transverse dimension diminishes progressively from the rear towards the front of the vehicle. These frame means E extend forward from the motor-propellant unit 2 by a distance D, and have a suitable mechanical strength so that, on frontal shock of the vehicle against an obstacle, the vehicle is subjected to an increase in deceleration which reaches the above-said critical value before the front part A of the engine, as a result of the deformation of the abovesaid frame means, comes into abutment against the wall. The term "wall" is used in a very general sense and denotes either a part of the deformed body work, or any other obstacle to the forward movement of the unit 2.

Generally, to respect these conditions, there is provided a free space 21 between the front part A of the motor-propellant unit 2 and the nearest element situated in front of the unit 2, this element being, for example, the radiator 22 when the vehicle is equipped therewith. A free space 23 substantially equal, in the longitudinal direction, to the space 21, is provided between the front of the body work and the radiator 22.

The lower elastic fixing elements 15, of which the metallic cups 16 are fixed on the inclined walls from the rear towards the front of the vehicle, neither break nor become detached on a shock, but constitute for the engine or the motor-propellant unit 2 a tilting axis situated at the level of the rigid base, that is to say in the case of the vehicle shown in FIG. 1, the level of the chassis 3.

This being the case, the behaviour of a vehicle according to the invention, on a front collision against an obstacle, is as follows.

The frame elements E of the engine, especially the lateral parts 20a, 20b, become deformed according to the speed of the vehicle just before collision, so that the vehicle undergoes a deceleration of which the law of variation, for example as a function of time, depends on the mechanical strength of the frame elements E.

If the speed before the shock is sufficient, the value of the deceleration for which the one or more rods 18 become broken, will be reached. By reason of the arrangement of the lateral parts 20a, 20b of the body work, this critical value of the deceleration will be, as previously explained, reached before the front part A of the motor-propellant unit 2 comes into abutment against a wall which could interfere with the movement of this motor-propellant unit. As a result when the motor-propellant unit 2 is liberated by the rupture of the one or more rods 18, it tilts forward, around the lower fixing elements 15.

Thus, on a front collision sufficiently violent to break the one or more rods 18, the inertial force of the motor-propellant unit 2 is not applied entirely to the vehicle and especially to the body of which the crushing of the front portion is as a result less important than with a conventional assembly in which the amount of total movement of the vehicle and of the motor-propellant unit 2 comes into play on a shock.

If the speed of the vehicle, just before collision, is sufficient for the slowing-down movement still to continue after the tilting forward of the motor-propellant unit 2, the latter, of which the front part A encounters an obstacle or the radiator 22 forming a "wall," takes part in the absorption of the remaining kinetic energy by (1) its change in position (that is to say, in the case of FIG. 1, by rotation around the lower fixing elements 15 in clockwise direction) and/or (2) its crushing.

The stresses applied to the front part of the body of a vehicle according to the invention, on a front collision, are reduced and, consequently, it is possible to lighten the structure without modifying either the resistance to crushing of the cab or the deceleration that the latter will sustain on shock.

The passive safety is improved since:

after its at least partial detachment, the engine moves forward relative to the cab; this increases the distance between the occupants and the engine, which can constitute an injurious rigid obstacle at the moment of collision; it is noted, in fact, that the engine, on frontal shock, generally is driven into the cab and constitutes a danger for the occupants of a vehicle of the prior art;

in the embodiment considered, a part of the forces usually sustained by the body is, here, transmitted to the base, that is to say to the chassis 3, which is stronger and less injurious due to the fact of its lower position.

As is self-evident, the invention is in no way limited to the embodiment considered, but encompasses, on the contrary, all modifications, especially those in which all of the fixing elements would be arranged to liberate the engine, in particular by being broken, when the critical value of the deceleration is reached or those in which the fixing elements would be constituted by elements other than ties or elastic supports.

I claim:

1. An automobile vehicle, comprising in combination, a vehicle body, driving means, means for mounting said driving means, attachment means connecting said driving means in a forward part of the vehicle to said mounting means in front of the body, and means extending said forward part of the vehicle in front of the driving means and having sufficient mechanical strength so that on impact with an obstacle said extending means become deformed and thereby cause an increasing deceleration of the vehicle which reaches a critical value before the driving means comes into abutment against a surface in front of it, said attachment means being adapted to be ruptured by the effect of the inertia of the driving means when said critical value is reached, said rupture permitting the driving means to move forwardly relative to the body.

2. Vehicle according to claim 1, wherein said attachment means comprise a tie in the form of a rod adapted to break when the deceleration of the vehicle reaches said critical value.

3. Vehicle according to claim 2, wherein the rod is oriented in the longitudinal direction of the vehicle.

4. Vehicle according to claim 2, wherein the vehicle comprises an engine-mounting chassis raised towards the front to form a a box frame, said driving means being connected to the upper part of said box frame by at least one said tie, the the attachment means comprising elastic supports connecting the driving means at its lower part to the chassis.

5. Vehicle according to claim 4, wherein the centre of gravity of the driving means is situated above and in front of the lower elastic supports.

6. Vehicle according to claim 2, wherein the critical value of the deceleration is of the order of 80 to 100 meters per second per second.

7. Vehicle according to claim 1, wherein said extending means are constituted by lateral parts of the body, adapted through their deformation, in the case of frontal shock, to absorb at least a part of the kinetic energy of the vehicle.

8. Vehicle according to claim 7, wherein said lateral parts are constituted by box frame members whose cross-section diminishes gradually from rear to front of the vehicle.

9. Vehicle according to claim 1, comprising a water radiator situated in front of the driving means, wherein there exists a free longitudinal space between the water radiator and the front part of the driving means.

10. Vehicle according to claim 9, wherein the attachment means comprise tie in the form of a rod adapted to break when the deceleration of the vehicle reaches said critical value, and wherein said critical value is of the order of 80 to 100 meters per second per second.

11. Vehicle according to claim 1, wherein said extending means are lateral.

12. Vehicle according to claim 1, wherein the driving means is transversal.

13. Vehicle according to claim 1, wherein the front of said driving means is sufficiently spaced from the nearest element in front of it of the vehicle to permit the top of the driving means to tilt forward and downward before said driving means is tilted backward by said nearest element.

* * * * *